US008282014B2

(12) United States Patent
Behm et al.

(10) Patent No.: US 8,282,014 B2
(45) Date of Patent: Oct. 9, 2012

(54) METHOD AND SYSTEM FOR TERMINAL DISPENSED LOTTERY TICKET WITH VALIDATION MARK

(75) Inventors: William Behm, Roswell, GA (US); Kenneth A. Stephens, Alpharetta, GA (US)

(73) Assignee: Scientific Games International, Inc., Newark, DE (US)

( * ) Notice: Subject to any disclaimer, the term of this patent is extended or adjusted under 35 U.S.C. 154(b) by 533 days.

(21) Appl. No.: 12/235,725

(22) Filed: Sep. 23, 2008

(65) Prior Publication Data

US 2009/0084843 A1 Apr. 2, 2009

Related U.S. Application Data

(60) Provisional application No. 60/975,958, filed on Sep. 28, 2007.

(51) Int. Cl.
*G06K 19/05* (2006.01)

(52) U.S. Cl. .......................................... 235/493; 235/494

(58) Field of Classification Search .................. 235/493, 235/494, 468
See application file for complete search history.

(56) References Cited

U.S. PATENT DOCUMENTS

| | | | | |
|---|---|---|---|---|
| 4,191,376 | A | 3/1980 | Goldman et al. | |
| 5,286,061 | A | 2/1994 | Behm | |
| 5,978,013 | A | 11/1999 | Jones et al. | |
| 6,127,073 | A | 10/2000 | Nohr et al. | |
| 6,142,533 | A | 11/2000 | Borowski, Jr. | |
| 6,752,319 | B2 | 6/2004 | Ehrhart et al. | |
| 7,114,750 | B1 | 10/2006 | Alasia et al. | |
| 2002/0053597 | A1 | 5/2002 | Ehrhart et al. | |
| 2003/0042306 | A1 | 3/2003 | Irwin, Jr. et al. | |
| 2005/0133584 | A1* | 6/2005 | Finnerty et al. | 235/375 |
| 2006/0081710 | A1* | 4/2006 | Streeter | 235/454 |
| 2007/0210572 | A1* | 9/2007 | Halbrook et al. | 283/62 |

OTHER PUBLICATIONS

PCT Search Report, Dec. 22, 2008.

* cited by examiner

*Primary Examiner* — Daniel St.Cyr
(74) *Attorney, Agent, or Firm* — Dority & Manning, P.A.

(57) ABSTRACT

Lottery tickets are printed and validated ("branded") at a point-of-sale terminal by providing a stock paper to the terminal, the stock paper having a first defined inkjet printing section, and a second defined section having a thermally sensitive ink composition applied thereto. At the point-of-sale terminal, the individual lottery tickets are printed on the stock paper, including printing game data and related indicia on the first section with an inkjet printer. For each ticket presented as a winning ticket, a validation mark is formed on the ticket by exposing the second section of the stock paper to a heat source to activate the thermally sensitive ink composition.

14 Claims, 4 Drawing Sheets

METHOD AND SYSTEM FOR TERMINAL DISPENSED LOTTERY TICKET WITH VALIDATION MARK

PRIORITY CLAIM

The present application claims priority to U.S. Provisional Application Ser. No. 60/975,958, filed Sep. 28, 2007.

FIELD OF THE INVENTION

The present invention relates to lottery tickets that are printed and redeemed at a point of sale terminal, and more particularly to a lottery ticket having a separate printing section for a validation mark.

BACKGROUND OF THE INVENTION

Various examples of lottery games are well-known wherein players purchase game related tickets or receipts at a remote point of sale, such as a retail establishment. For example, state and multi-state lotteries are conducted at numerous remote terminals whereby players designate a set of numbers, or elect a random set of generated numbers. A receipt or ticket reflecting the player's numbers is printed at the point of sale terminal. These remote terminals are networked with the gaming authority's central computer, and a record is made of the pertinent data related to the ticket sale, including a serial number or other identifying data. The game is concluded with a drawing conducted by the gaming authority and publication of the winning numbers. The winning tickets are presented by players for redemption at an approved lottery location, which may be the point of initial purchase of the ticket.

The typical lottery terminal includes a thermal printer that prints the lottery ticket on stock thermal paper supplied in roll form. This paper may have any manner of indicia pre-printed thereon. For example, the paper may have a background pattern, or indicia identifying the game, game administrator, rules, and so forth on one or both sides of the paper. The game data (i.e., selected numbers, time and date, serial number, terminal location, and the like) may be thermally printed over the indicia or in a blank area of the paper bordered by the indicia. The conventional thermal printers and processes are relatively efficient and inexpensive, but are limited in their ability to print colorful and aesthetically pleasing tickets, which can detract from the overall appeal of the game to the public.

It is also a typical practice to "brand" the lottery tickets presented for redemption with a validation mark, for example by printing a word mark or pattern on the ticket in the scanning process. This mark indicates to all that the ticket has already been played and redeemed. The mark may also prevent subsequent scanning or reading of the ticket. Reference is made to U.S. Pat. No. 6,752,319 for a discussion of a branding process using an invisible material on the ticket that becomes visible when exposed to radiant heat.

The present invention relates to an improved process an associated lottery tickets that offer the advantages of inkjet printed tickets with an inexpensive branding process.

SUMMARY OF THE INVENTION

Objects and advantages of the invention will be set forth in part in the following description, or may be obvious from the description, or may be learned through practice of the invention.

Aspects of the present invention involve a method of printing and validating lottery tickets, particularly at the point of sale terminal. The method involves providing a stock paper to the terminal on which the lottery tickets are printed. The stock paper has a first section configured particularly for inkjet printing. In other words, this first section is an inkjet compatible paper. Inkjet compatible papers are well known in the industry and typically have a wax film coating that provides the paper with an enhanced brightness and decreased ink absorption such that the individually deposited ink dots do not readily diffuse and spread into the paper, but maintain a well defined shape. These properties result in a crisp and clear inkjet printed pattern. A second defined section of the stock paper is suitable for thermal printing, and includes a thermally sensitive ink composition applied thereto. Thermal print paper is typically a plain or bond paper having a heat reactive ink or dye applied thereto, and is also referred to as thermochromatic paper.

At a point of sale terminal, such as typically found in a retail establishment, individual lottery tickets are printed on the stock paper. This printing process includes printing game data and related game indicia on the first section with an inkjet printer. In this manner, the game data and indicia may be presented in multiple colors, and in a generally aesthetically pleasing format that is not possible with conventional thermal printing. The second defined section containing the thermally sensitive ink composition is not printed on at this time.

When a winning ticket is presented for redemption or validation, the ticket is "branded" with a validation mark by exposing the second section of the stock paper to a heat source so that the thermally sensitive ink composition is activated and produces any manner of indicia, pattern, words, and the like, that constitutes a branded validation mark.

In a particular embodiment, the second section is defined on the stock paper in one or more stripes of the thermally sensitive ink composition. For example, a stripe may be defined along the longitudinal edge of the stock paper. In an alternate embodiment, the stripes may be provided at each longitudinal edge of the paper. In still another embodiment, the stripes may be provided at other locations, and may form, for example, a border around the lottery ticket.

The second section may have the thermally sensitive ink composition applied as a continuous coating, such as a continuous stripe. In other embodiments, the ink composition may be applied in any continuous or discontinuous pattern or indicia. These terms are meant to encompass any design, words, pattern, or any other mark that, when rendered visible, serves as a validation mark. The thermally sensitive ink composition may be applied using an suitable coating or printing technique.

The second section may be formed on the stock paper by coating the stock paper with the thermally sensitive ink composition, and then applying a protective coating over the ink composition in a subsequent coating or printing step.

For embodiments wherein the second section has a generally continuous coating of the thermally sensitive ink composition, the second section can be exposed to a uniform heat source such that the validation mark appears as a continuous region, such as a continuous stripe, in the second section. The uniform heat source may be provided by different suitable devices, such as a radiant heat bar, heat lamp, and so forth, configured with a scanner at the point of sale used to scan and validate the tickets.

In an alternate embodiment wherein the second section has a generally continuous coating of the thermally sensitive ink composition, the second section may be exposed to a thermal print head that functions as the heat source, with the validation mark appearing as any manner of indicia printed by the thermal print head, as with a conventional thermal printing process.

In particular embodiments, the thermally sensitive ink composition may be applied to the second section as a discontinuous pattern or indicia that is then exposed to a uniform heat source such that the validation mark appears as the originally applied pattern or indicia. For example, the ink composition may be "printed" in the second section as a floral design or repeating border design, and dried on the stock paper in this pattern. Once the second section is exposed to heat, the ink is activated and the pattern or indicia becomes visible.

The thermally sensitive ink composition may be substantially invisible in its inactivated state, or may have a first color or hue. When the ink composition is exposed to heat, the ink composition changes state (i.e., color) and the validation mark becomes visible. Preferably, the transformation of the ink composition is irreversible. Various thermally sensitive inks (i.e. thermochromatic inks) are known and commercially available, and may be used in the ink composition according to the invention.

In a unique embodiment, the game data and indicia is printed in the first section in multiple colors with the inkjet printer, and the validation mark appears as a single uniform color once activated by the heat source.

The stock paper may be made in a conventional paper conversion process wherein, at some point in the process, a region of the paper, such as the edge strips of the paper, are coated or printed with the thermally sensitive ink. In this conversion process, the initial stock paper may be a plain or bond paper that is treated in a first process to be inkjet compatible in a region or area corresponding to the first section of the lottery tickets, and then treated in a second area or region with the thermally sensitive ink corresponding to the second section of the lottery tickets. In an alternative conversion process, the initial stock paper may be an inkjet compatible paper, with a region or area of the paper being coated with the thermally sensitive ink corresponding to the second section of the lottery tickets. Any combination of known paper conversion processes may be used to form the lottery ticket stock paper.

Aspects of the invention will be described in greater detail below by reference to particular embodiments illustrated in the figures.

DETAILED DESCRIPTION

Figure 1A:
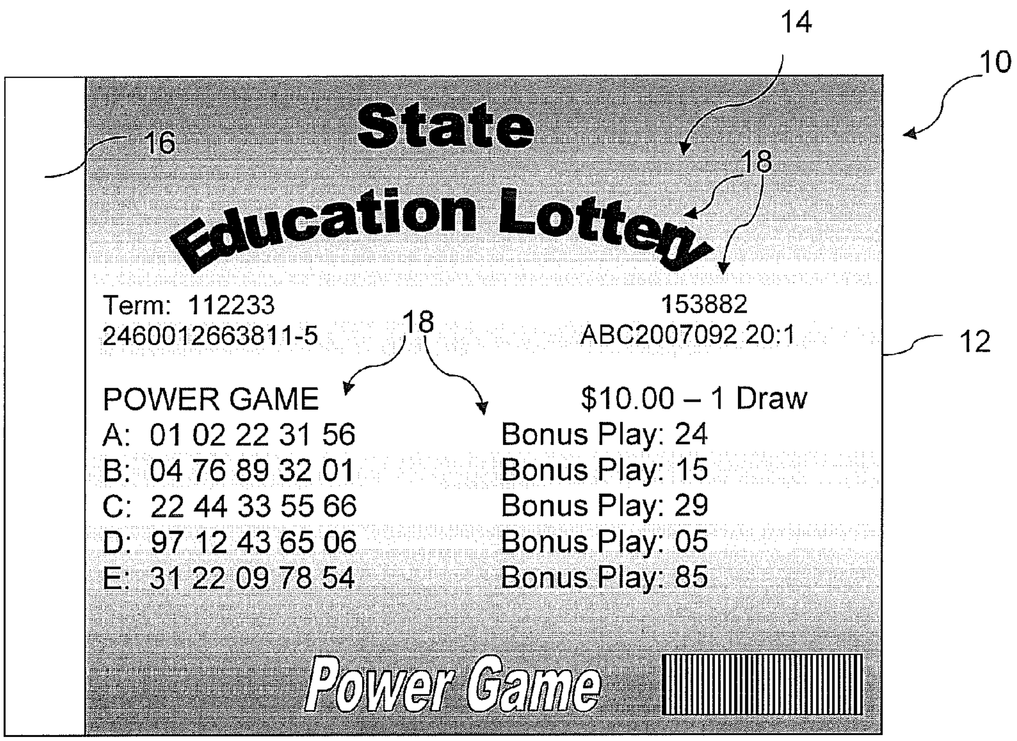
FIG. 1A is a perspective view of an embodiment of a lottery ticket incorporating aspects of the invention.

Reference will now be made in detail to embodiments of the method and system according to the invention, particular examples of which are illustrated in the drawings. Each embodiment is provided by way of explanation of the invention, and not meant as a limitation of the invention. For example, features illustrated or described with respect to one embodiment may be used with another embodiment to yield still a further embodiment. It is intended that the invention include these and other modifications and variations to the embodiments illustrated and described herein as come within the scope and spirit of the invention.

Various embodiments 10 of lottery tickets in accordance with aspects of the invention are illustrated in FIGS. 1A, 1B, 2, and 3. Each of the tickets 10 is the type that are printed at a point of sale terminal, and are printed on a stock paper 12 that is generally provided in the form of a roll that is placed in the terminal printer. A supply of the rolls is typically kept on hand at the point of sale terminal, and the rolls are replaced as necessary. Individual lottery tickets 10 are printed, cut, and dispensed at the terminal.

Each of the tickets 10 printed on the stock paper 12 includes a first section 14. This section 14 may be any designated or defined section of the ticket and, in the illustrated embodiment, encompasses all of the ticket 10 except for a longitudinal border region along the left-hand side of the ticket 10. The first section 14 is an inkjet printing compatible section. In other words, the first section 14 is inkjet compatible paper. As mentioned, inkjet compatible paper has certain characteristics, such as increased brightness and decreased ink absorption, which make the paper particularly suitable for inkjet printing. Inkjet compatible paper may include a surface treatment of a waxy film for this purpose. As is generally recognized, inkjet printing provides a clean, crisp print matrix is particularly suited for color printing. Thus, in the first section 14 of the tickets 10, the game data and any other game related indicia 18 are inkjet printed in any desired configuration, color scheme, and so forth. The game data and indicia 18 may be presented in a colorful aesthetically pleasing format that appeals to players and, thus, may serve to market the game and generate name recognition for a particular game. It should be readily appreciated that the game data and related indicia 18 may be presented in the first section 14 in any conceivable format and color scheme.

A second section 16 of the stock paper 12 is also defined on the tickets 10. The second section 16 has different surface characteristics than the first section 14, and includes a thermally sensitive ink composition. In the illustrated embodiments, the second section 16 is defined as a longitudinal stripe region. However, it should be readily appreciated that the second section 16 may be defined in any pattern or location on the surface area of the individual tickets 10. One or more longitudinal stripe regions along the edges of the tickets 10 may be preferred from a manufacturing standpoint.

It should be understood that the thermally sensitive ink composition is used herein to include any heat reactive ink or dye composition used to make thermal print paper, which is also known in the art as thermochromatic paper.

In a particular embodiment, the thermally sensitive ink composition includes an ink known as "Thermal InkSecure™" ink commercially available from Mark-Sensing Ltd., of Australia. Certain embodiments of the composition may contain the ink from about 60% to about 99% by weight. The composition may include other components to aid in application, durability, and dispersion of the composition. For example, the composition may include from about 0 to about 40% of Kaolin clay, and from about 0 to about 1% of an anti-foam agent to enhance durability, dispersion, and application of the composition. It should be readily appreciated that those skilled in the art may formulate any suitable thermally sensitive ink composition in accordance within the scope and spirit of the invention.

The thermally sensitive ink composition may be slightly visible, or substantially invisible. In an alternative embodiment, the composition may include a pigment or color tint. Thermal inks, such as the Thermal InkSecure ink mentioned above, react irreversibly when subjected to heat, typically in excess of 200° F. The irreversible reaction causes the ink to change color, and thus the ink pattern becomes visible, or at least more distinguishable.

The thermally sensitive ink composition may include a top protective coating to prevent the ink from wearing off in normal processing of the lottery tickets 10. This protective coating may be, for example, an acrylic polymer water-based topcoat. In a particular embodiment, this topcoat may include an acrylic copolymer (Rhoplex 1-2426D) as a primary component. The topcoat composition may be applied by any suitable technique over the thermally sensitive ink composition and subsequently dried in a forced hot-air oven, or other suitable technique. Care should be taken not to exceed the activation temperature of the thermally sensitive ink. The use of clear or colored protective topcoats on lottery and other game tickets, particularly instant scratch-off tickets, is well known in the industry, and any one or combination of these topcoats may be utilized within the scope and spirit of the invention.

Figure 1B:
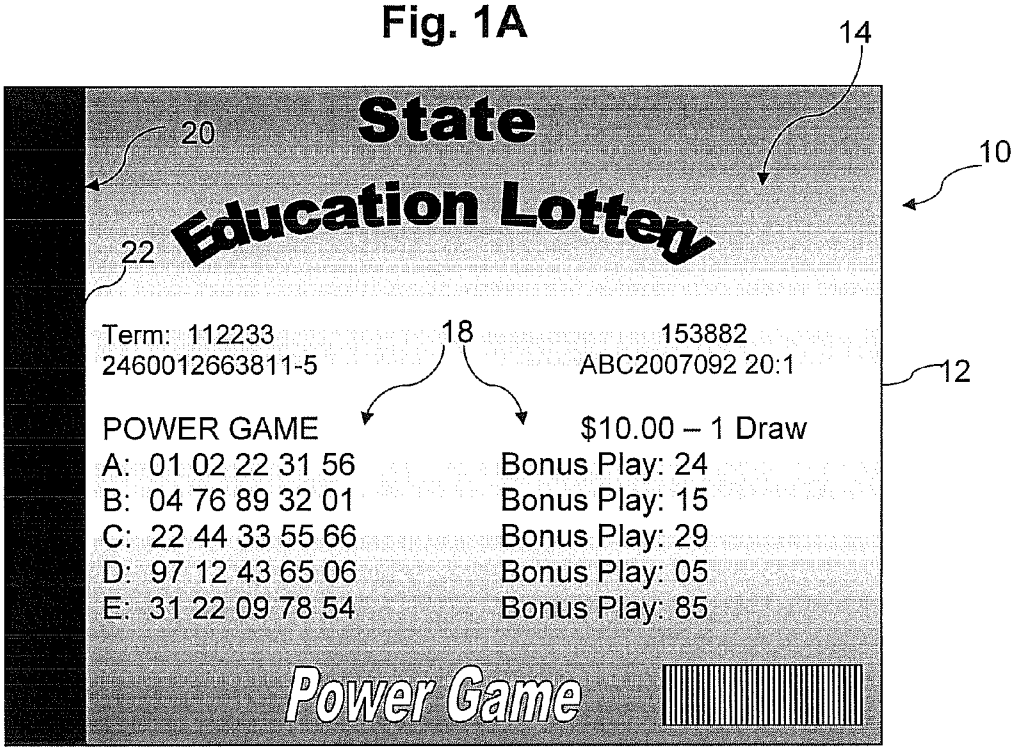
FIG. 1B is a perspective view of the ticket in FIG. 1A after validation and activation of the thermally sensitive ink composition.

Referring to FIGS. 1A and 1B, the second section 16 of the ticket 10 includes the thermally sensitive ink composition applied as a generally continuous stripe along the left-hand edge of the ticket. In FIG. 1A, the ticket 10 has not been activated and, thus, the thermally sensitive ink composition is clear (i.e., substantially invisible), or may be tinted. FIG. 1B illustrates the ticket 10 after the ticket has been submitted for scanning and validation at the point of sale. The ticket would be inserted into a scanner that includes an internal heat source with an effective width that is at least as wide as the second section 16 on the tickets 10. As the ticket 10 is passed under the heat source, sufficient heat is supplied so as to activate the thermally sensitive ink composition. In FIG. 1B, the entire second section 16 changes color due to activation of the ink, and thus the retailer and player are provided with a validation mark 20 in the form of a continuous darkened strip 22.

Figure 2:
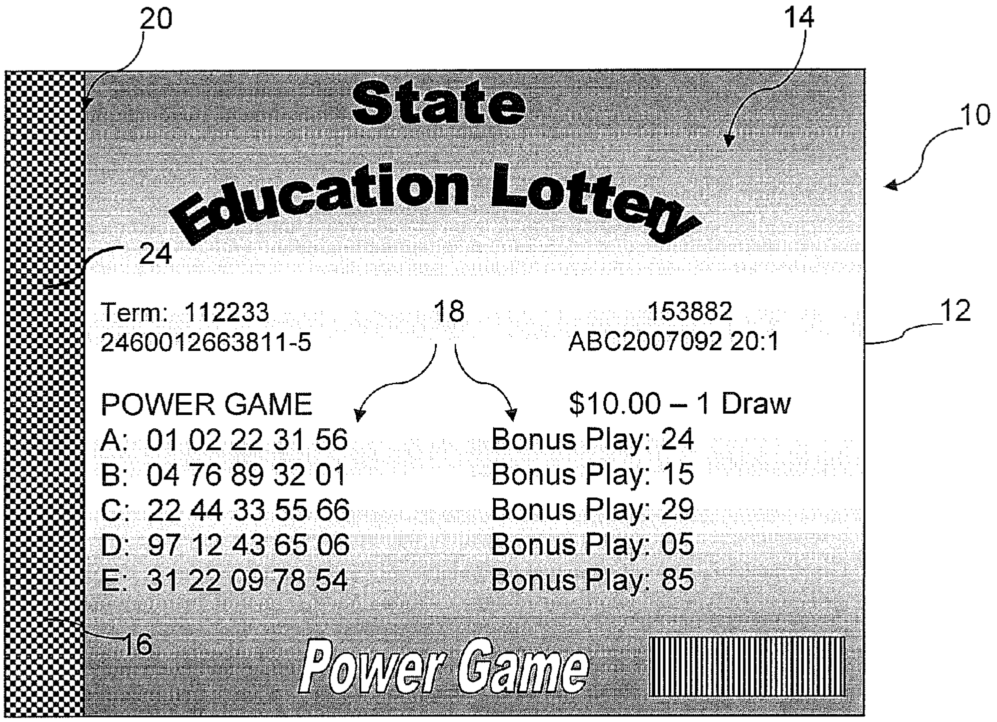
FIG. 2 is an alternative embodiment of a lottery ticket in accordance with aspects of the invention.

It should be understood that the thermally sensitive ink composition may be applied to the second section 16 in any continuous or discontinuous pattern. For example, the ink composition may be "printed" in a discontinuous border pattern 24 as indicated in FIG. 2. When the ticket 10 of FIG. 2 is exposed to sufficient heat, the validation mark 20 is formed as a checkerboard or other suitable pattern that is readily visible to the retailer and player as a validation mark.

Figure 3:
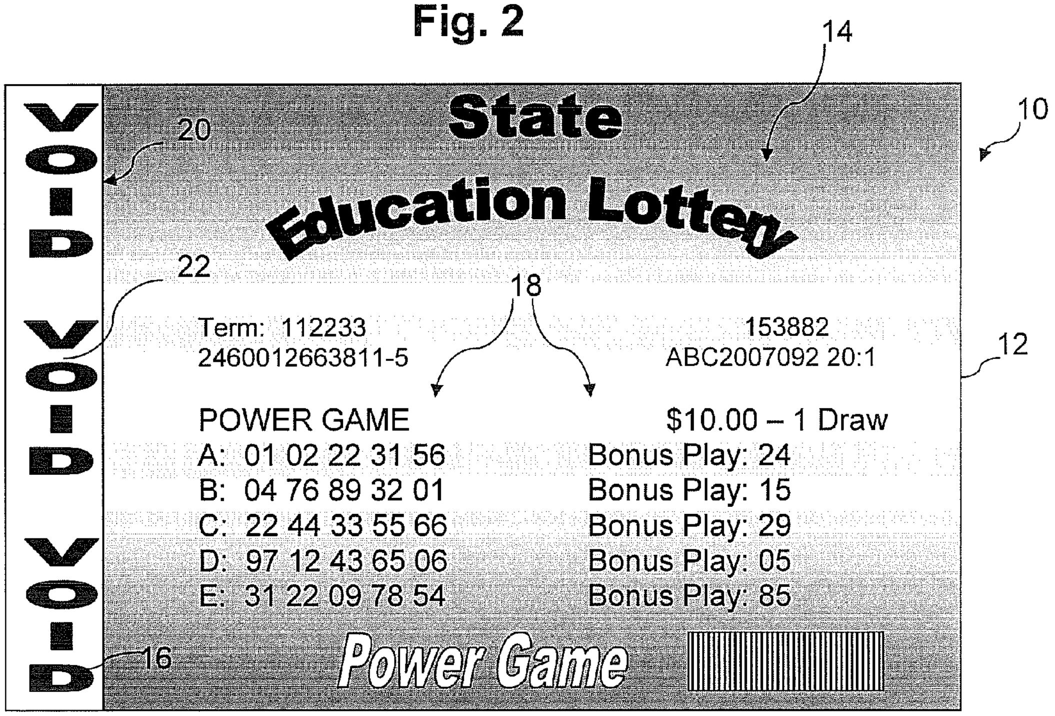
FIG. 3 is still another alternative embodiment of a lottery ticket in accordance with aspects of the invention.

Referring to FIG. 3, the thermally sensitive ink is applied to section 16 in the form of a word pattern that may be substantially invisible or slightly visible on the ticket as an initially printed. Upon scanning an exposure of the ticket 10 to a heat source, the words printed in second section 16 become readily visible, and provide a word validation mark 26, as depicted in FIG. 3.

The embodiment of FIGS. 1A and 1B may be desired from a manufacturing standpoint in that a coating application of a continuous strip region may be less expensive and easier than printing of the ink in a discontinuous pattern, words, or any discontinuous indicia.

As mentioned, the terminal/scanner incorporates a heat source to activate the thermally sensitive ink composition within the second section 16. This heat source may be, for example, a heat bar, light, or other suitable heat source that generates heat over an area sufficient to expose the surface area of second section 16.

In an alternative embodiment, the heat source within the terminal can comprise a conventional thermal print head. With this configuration, the validation mark may be formed as a discontinuous pattern, such as the mark 24 in FIG. 2 and word mark 26 in FIG. 3, by selective application of heat to a second section 16 having a continuous coating of the thermally sensitive ink. This process is analogous to a conventional thermal printer wherein the entire sheet of paper is a thermal paper, and the printed matter is formed by discrete application of heat via the thermal print head. Thus, it is possible to coat second section 16 of the lottery tickets 10 with a continuous coating of the thermally sensitive ink, yet produce a discontinuous validation mark with a conventional thermal print head.

Figure 4A:
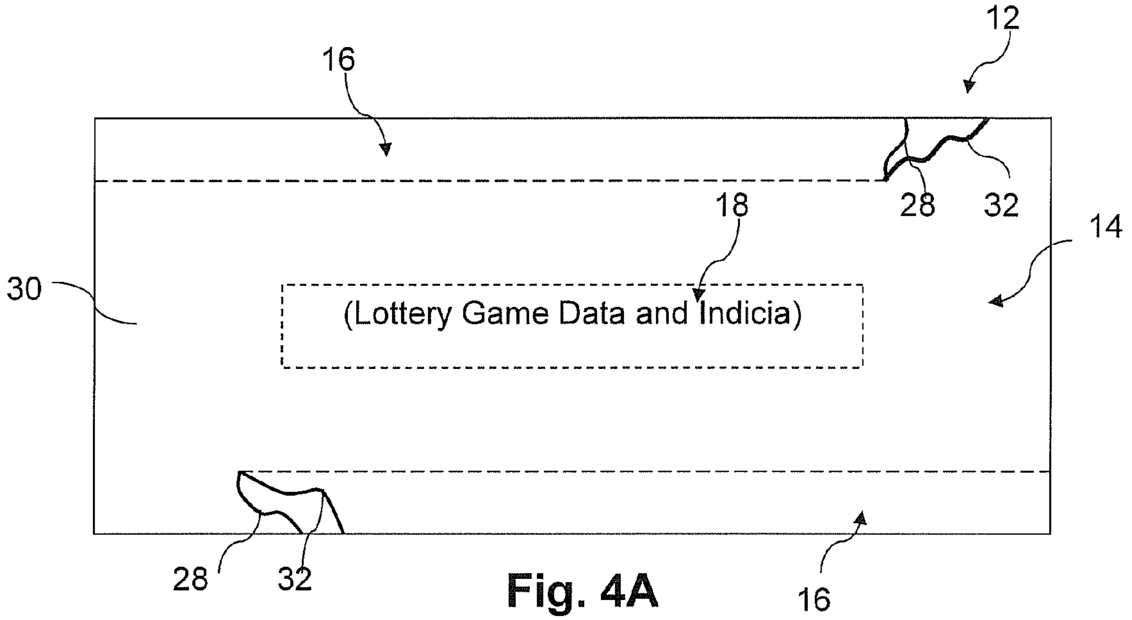
FIGS. 4A and 4B are planar, partial cut-away views illustrating different layered configurations of paper stock that may be used for lottery tickets according to the invention.

FIG. 4A conceptually illustrates an embodiment of stock paper 12 used for the individual tickets 10. In this particular embodiment, the stock paper 12 includes a base paper 30 that is an inkjet paper. Opposite continuous strips of a layer 28 of thermally sensitive ink composition are applied along opposite longitudinal edges of the base paper 30 to define the second sections 16. The first section 14 is thus the area of the base paper 30 between the second sections 16, and includes any manner of lottery game data and indicia 18 inkjet printed in any desired configuration. A protective topcoat layer 32 is applied over the layer 28 of thermally sensitive ink in each of the second sections 16.

Figure 4B:
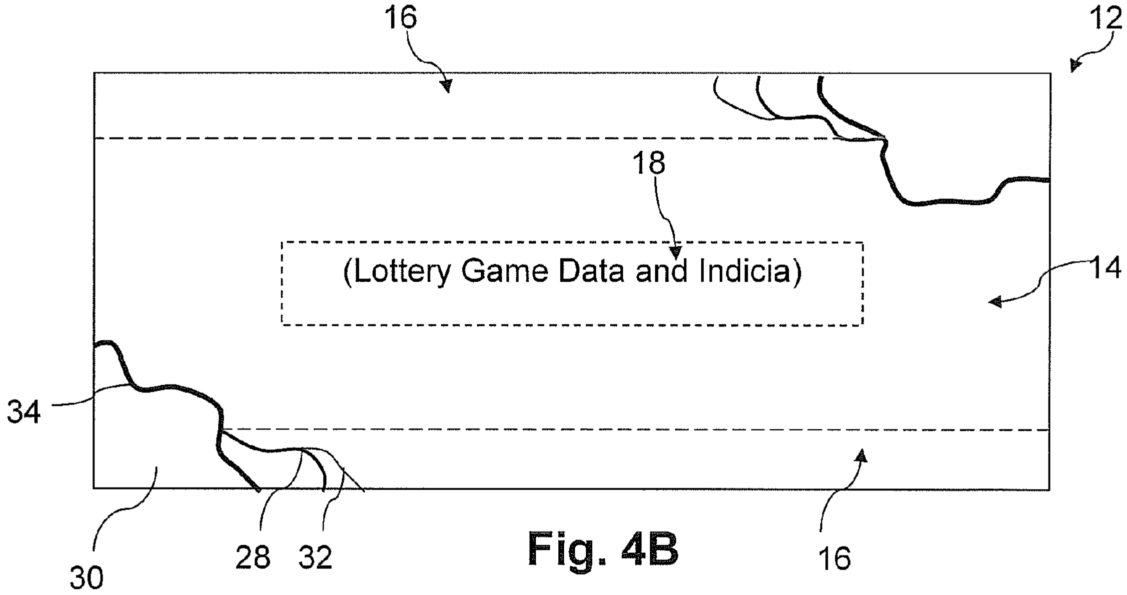

In the embodiment of FIG. 4B, the stock paper 12 includes a base paper 30 that may be a relatively inexpensive bond paper. A first coating 34 is applied to the base paper 30 to render the paper inkjet compatible. Continuous strips of the thermally sensitive ink are applied as layers 28 along the opposite longitudinal sides of the base paper 30, with a layer 32 of a protective topcoat being applied over the ink layer 28. Again, the first section 14 is the area of the stock paper 12 defined between the second sections 14, and contains any manner of inkjet printed lottery game data and indicia 18. With this embodiment, it should be appreciated that the inkjet coating 34 need not extend to the longitudinal edges of the stock paper 30, but may be applied as a center strip along the stock paper 12 leaving the base paper 30 exposed along the longitudinal edges. The exposed portions of the base paper 30 would then be coated with the layer 28 of thermally sensitive ink and protective topcoat layer 32.

Figure 5:
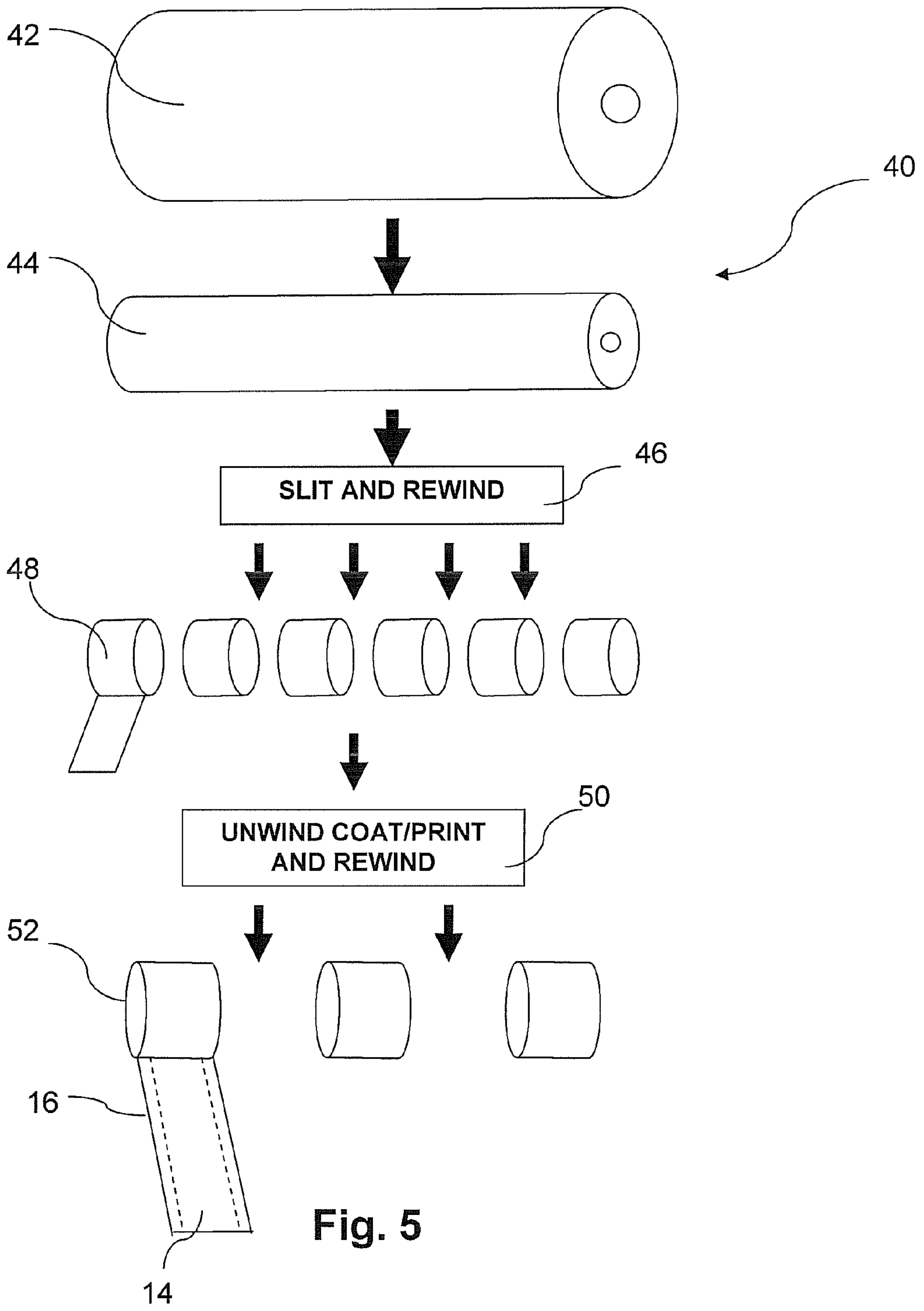
FIG. 5 is a conceptual illustration of a paper conversion process that may be used for forming the lottery stock paper.

FIG. 5 is a conceptual illustration of any one of a number of suitable paper conversion processes wherein rolls of the lottery stock paper may be formed. In the illustrated process, a master roll of paper 42 is provided, which may be an inkjet paper. In an unwind and rewind process, the master roll 42 is reduced to a number of sub-rolls 44 of a desired diameter. The sub-rolls 44 may then undergo a slitting and rewind process 46 wherein the paper is unwound, slit, and rewound onto individual mandrels to form initial stock paper rolls 48. These rolls 48 may then undergo an unwinding and rewinding process 50 wherein the longitudinal edges of the paper are coated or printed with the thermally sensitive ink composition. The process is carefully controlled so that the composition is dried prior to rewinding the paper into the finished stock paper rolls 52 having second sections 16 and first section 14 defined thereon.

It should be readily appreciated that the conversion process conceptually illustrated in FIG. 5 is for exemplary purposes only, and that any conversion process wherein a master roll of material is eventually converted into individual rolls of stock paper for purposes of the present invention are within the scope and spirit of the invention. Paper conversion techniques and processes are well known to those skilled in the art paper converting arts, and a detailed explanation thereof is not necessary for purposes of the present invention.

It should be appreciated by those skilled in the art that various modifications and variations can be made to the systems and methods described herein without departing from the scope and spirit of the invention.

What is claimed is:

1. A method of printing and validating a lottery ticket at a point-of-sale terminal, comprising:

providing a stock paper to the terminal, the stock paper having a first defined inkjet printing section, and a second defined section having a thermally sensitive ink composition applied thereto;

at the point-of-sale terminal, printing an individual lottery ticket on the stock paper, including printing game data and related indicia on the first section with an inkjet printer;

for each ticket presented as a winning ticket, forming a permanent and continually visible validation mark on the ticket by exposing the second section of the stock paper to a heat source to activate the thermally sensitive ink composition, such that the validation mark remains visible on the lottery ticket to show that it has been submitted for validation;

forming the second section by coating the stock paper with the thermally sensitive ink composition in the second section, and applying a protective coating over the coating of thermally sensitive ink composition; and wherein the thermally sensitive ink composition is applied to the second section as a pattern or indicia that is exposed to a uniform heat source such that the validation mark appears as the originally applied pattern or indicia.

2. The method as in claim 1, comprising defining the second section on the stock paper in one or more strips of the thermally sensitive ink composition.

3. The method as in claim 2, comprising applying the thermally sensitive ink composition as a continuous longitudinal strip along a longitudinal edge of the stock paper.

4. The method as in claim 2, comprising defining the second section on the stock paper as any combination of pattern or indicia of the thermally sensitive ink composition.

5. The method as in claim 1, wherein the second section has a generally continuous coating of the thermally sensitive ink composition that is exposed to a uniform heat source such that the validation mark appears as a continuous region in the second section.

6. The method as in claim 1, wherein the second section has a generally continuous coating of the thermally sensitive ink composition that is exposed to a thermal print head such that the validation mark appears as any manner of indicia printed by the thermal print head.

7. The method as in claim 1, comprising printing the game data in multiple colors with the inkjet printer, with the validation mark appearing as a single uniform color.

8. The method as in claim 1, comprising forming the stock paper in a conversion process wherein a base stock paper is treated in a region corresponding to the first section with an inkjet compatible coating, and is treated in a second region corresponding to the second section with the thermally sensitive ink composition.

9. The method as in claim 1, comprising forming the stock paper in conversion process wherein inkjet paper stock is coated in a defined area corresponding to the second section with the thermally sensitive ink composition.

10. A lottery or game ticket printed at a point-of-sale terminal, comprising a stock paper having a first defined inkjet printing section, and a second defined section having a thermally sensitive ink composition applied thereto;

game data and related indicia inkjet printed on said first section;

said second section having said thermally sensitive ink composition applied in an amount and pattern such that upon exposure of said second section to a heat source, a said ink composition is activated and produces a permanent and continually visible validation mark, thereby indicating the ticket has been submitted for validation wherein the thermally sensitive ink composition is applied to the second section as a pattern or indicia that is exposed to a uniform heat source such that the validation mark appears as the originally applied pattern or indicia; and a protective coating over said pattern of thermally sensitive ink composition.

11. The ticket as in claim 10, wherein said pattern of thermally sensitive ink composition comprises a continuous strip along at least one longitudinal edge of said ticket.

12. The ticket as in claim 10, wherein said pattern of thermally sensitive ink composition comprises indicia.

13. The ticket as in claim 10, wherein said stock paper comprises inkjet paper stock, and said second section is formed by coating said inkjet paper stock with said thermally sensitive ink composition.

14. The ticket as in claim 10, wherein said stock paper comprises a base paper layer, said first section formed by coating an area of said base paper with a coating that renders said base paper inkjet compatible, and said second section is formed by coating a different area of said base paper with said thermally sensitive ink composition.

* * * * *